(12) United States Patent
Hwang et al.

(10) Patent No.: US 12,340,106 B2
(45) Date of Patent: Jun. 24, 2025

(54) STORAGE DEVICE FOR STORING ADDRESS INFORMATION OF TARGET PAGE WITH OVERWRITTEN DUMMY DATA AND OPERATING METHOD THEREOF

(71) Applicant: SK hynix Inc., Icheon (KR)

(72) Inventors: Tae Yeon Hwang, Icheon-si (KR); Kyung Hoon Lee, Icheon (KR); Sung Hun Jeon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/344,545

(22) Filed: Jun. 29, 2023

(65) Prior Publication Data
US 2024/0302981 A1    Sep. 12, 2024

(30) Foreign Application Priority Data
Mar. 6, 2023   (KR) .................. 10-2023-0028862

(51) Int. Cl.
*G06F 3/06* (2006.01)

(52) U.S. Cl.
CPC ............ *G06F 3/064* (2013.01); *G06F 3/0658* (2013.01); *G06F 3/0619* (2013.01); *G06F 3/0679* (2013.01)

(58) Field of Classification Search
CPC .......... G06F 3/06; G06F 3/064; G06F 3/0658; G06F 3/0679; G06F 3/0619; G06F 3/00652; G06F 3/0579
See application file for complete search history.

(56) References Cited

U.S. PATENT DOCUMENTS

| | | | | |
|---|---|---|---|---|
| 9,367,417 | B2* | 6/2016 | Jung | G06F 11/26 |
| 10,755,798 | B2* | 8/2020 | Yang | G11C 11/5642 |
| 2004/0257948 | A1* | 12/2004 | Kim | G11B 27/36 |
| 2005/0036422 | A1* | 2/2005 | Sasaki | G11B 20/10527 |
| 2015/0006939 | A1* | 1/2015 | Lim | G11C 5/148 |
| | | | | 713/324 |
| 2015/0332772 | A1* | 11/2015 | Kim | G11C 11/5635 |
| | | | | 365/185.18 |
| 2019/0198514 | A1* | 6/2019 | Kim | H10B 43/35 |
| 2019/0235954 | A1* | 8/2019 | Gim | G11C 11/5671 |
| 2021/0096948 | A1 | 4/2021 | Gopalakrishnan et al. | |
| 2021/0334173 | A1* | 10/2021 | Hwang | G06F 3/0683 |
| 2022/0115082 | A1* | 4/2022 | Ock | G11C 16/225 |

(Continued)

FOREIGN PATENT DOCUMENTS

KR    1020200050731 A    5/2020

OTHER PUBLICATIONS

Y.-M. Chang et al., "An Efficient Sudden-Power-Off-Recovery Design with Guaranteed Booting Time for Solid State Drives," 2016 IEEE 8th International Memory Workshop (IMW), Paris, France, 2016, pp. 1-4.*

(Continued)

*Primary Examiner* — Pierre Michel Bataille (57) ABSTRACT

A storage device may search for a target page among pages included in a first memory block of a plurality of memory blocks each including a plurality of pages, and when an uncorrectable error occurs while reading data stored in the target page, may overwrite dummy data into the target page and then store address information indicating a location of the target page in a second memory block among the plurality of memory blocks.

15 Claims, 10 Drawing Sheets

(56) References Cited

U.S. PATENT DOCUMENTS

| | | | |
|---|---|---|---|
| 2022/0137836 A1* | 5/2022 | Kang | G06F 11/073 714/6.11 |
| 2022/0229781 A1 | 7/2022 | Stumpf et al. | |
| 2022/0358016 A1* | 11/2022 | Park | G06F 11/1415 |
| 2023/0100865 A1* | 3/2023 | Chiu | G06F 3/064 711/154 |
| 2023/0140746 A1* | 5/2023 | Jung | G11C 29/44 714/764 |

OTHER PUBLICATIONS

N.-Y. Ahn and D. H. Lee, "Schemes for Privacy Data Destruction in a NAND Flash Memory," in IEEE Access, vol. 7, pp. 181305-181313, 2019.*

S.-H. Park, J.-W. Park, S.-D. Kim and C. C. Weems, "A Pattern Adaptive NAND Flash Memory Storage Structure," in IEEE Transactions on Computers, vol. 61, No. 1, pp. 134-138, Jan. 2012.*

H. Lee, S. Jung and Y. H. Song, "PCRAM-assisted ECC management for enhanced data reliability in flash storage systems," in IEEE Transactions on Consumer Electronics, vol. 58, No. 3, pp. 849-856, Aug. 2012.*

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017.*

* cited by examiner

STORAGE DEVICE FOR STORING ADDRESS INFORMATION OF TARGET PAGE WITH OVERWRITTEN DUMMY DATA AND OPERATING METHOD THEREOF

CROSS-REFERENCE TO RELATED APPLICATION

The present application claims priority under 35 U.S.C. 119(a) to Korean patent application number 10-2023-0028862 filed on Mar. 6, 2023, which is incorporated herein by reference in its entirety.

TECHNICAL FIELD

The embodiments of the present disclosure relate to a storage device for storing address information of a target page in which dummy data is overwritten, and an operating method thereof.

BACKGROUND

A storage device is a device for storing data based on a request from an external device such as a computer, a mobile terminal such as a smart phone or tablet, or various electronic devices.

The storage device may further include a controller for controlling memory (e.g. volatile memory/non-volatile memory). The controller may receive a command from an external device, and execute or control operations to read, write, or erase data in the memory included in the storage device based on the input command Meanwhile, in the case of an occurrence of a sudden power-off (SPO) in a storage device, the storage device may perform a sudden power-off recovery (SPOR) operation upon booting-up after the SPO. In this case, as a storage capacity of the storage device increases, the size of data to be processed during the SPOR operation increases, thereby increasing the boot-up time.

SUMMARY

Embodiments of the disclosure may provide a storage device and an operating method thereof capable of preventing a problem of rapidly increasing the time required for boot-up after a SPO.

In one aspect, embodiments of the disclosure may provide a storage device including i) a memory including a plurality of memory blocks each of which includes a plurality of pages, and ii) a controller configured to search for a target page among pages included in a first memory block of the plurality of memory blocks, and when an uncorrectable error occurs while reading data stored in the target page, overwrite dummy data into the target page and store address information indicating a location of the target page in a second memory block among the plurality of memory blocks.

In another aspect, embodiments of the disclosure may provide an operating method of a storage device including i) searching for a target page among pages included in a first memory block among a plurality of memory blocks each of which includes a plurality of pages, ii) reading data stored in the target page, and iii) when an uncorrectable error occurs while reading data stored in the target page, overwriting dummy data in the target page, and storing address information indicating a location of the target page in a second memory block among the plurality of memory blocks.

In another aspect, embodiments of the disclosure may provide a controller including i) a memory interface configured to communicate with a memory including a plurality of memory blocks each of which includes a plurality of pages, and ii) a control circuit configured to search for a target page, which is a page in which data is programmed last, among pages included in a first memory block of the plurality of memory blocks during a boot-up operation after a sudden power-off (SPO), and when an uncorrectable error occurs while reading data stored in the target page, overwrite dummy data into the target page and store a location of the target page in a second memory block of the plurality of memory blocks.

According to the embodiments of the present disclosure, it is possible to prevent a problem of rapidly increasing the time required for boot-up after a SPO

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
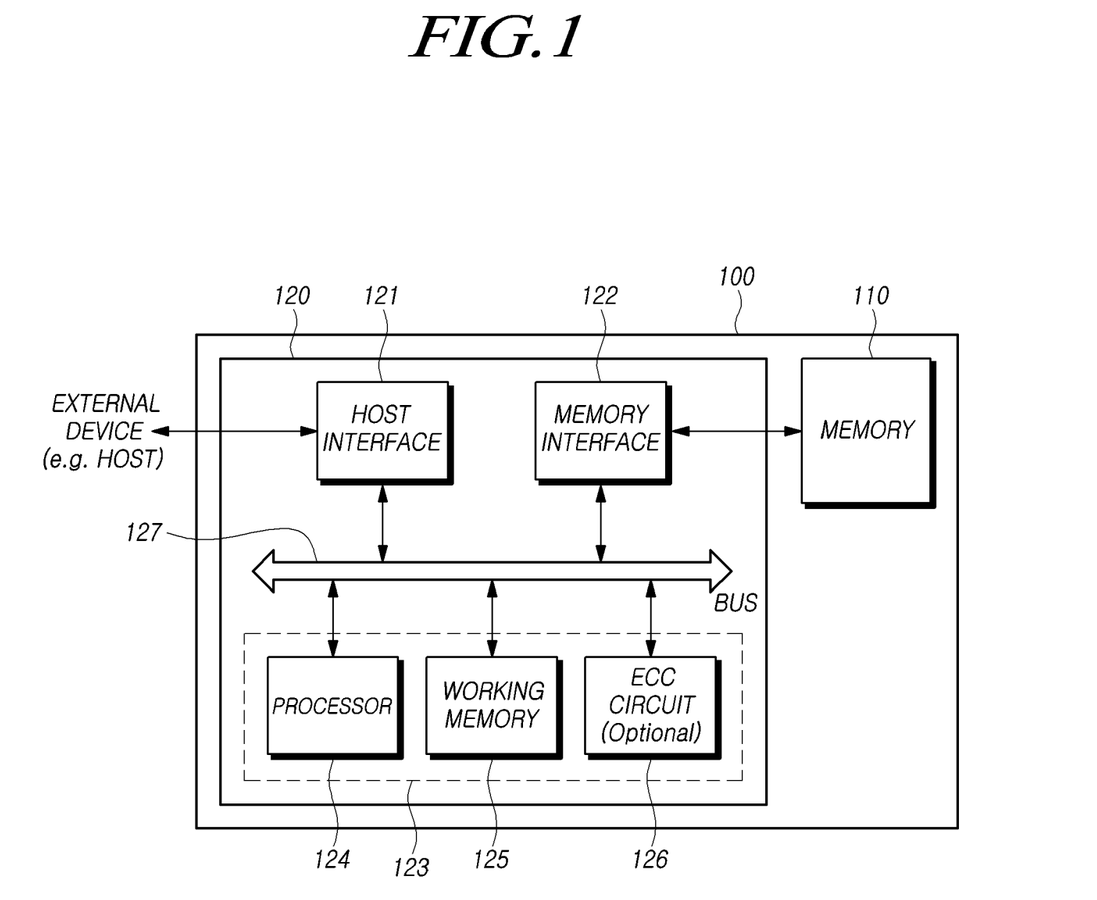
FIG. 1 is a schematic configuration diagram of a storage device according to an embodiment of the disclosure.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, or may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for performing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when performing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
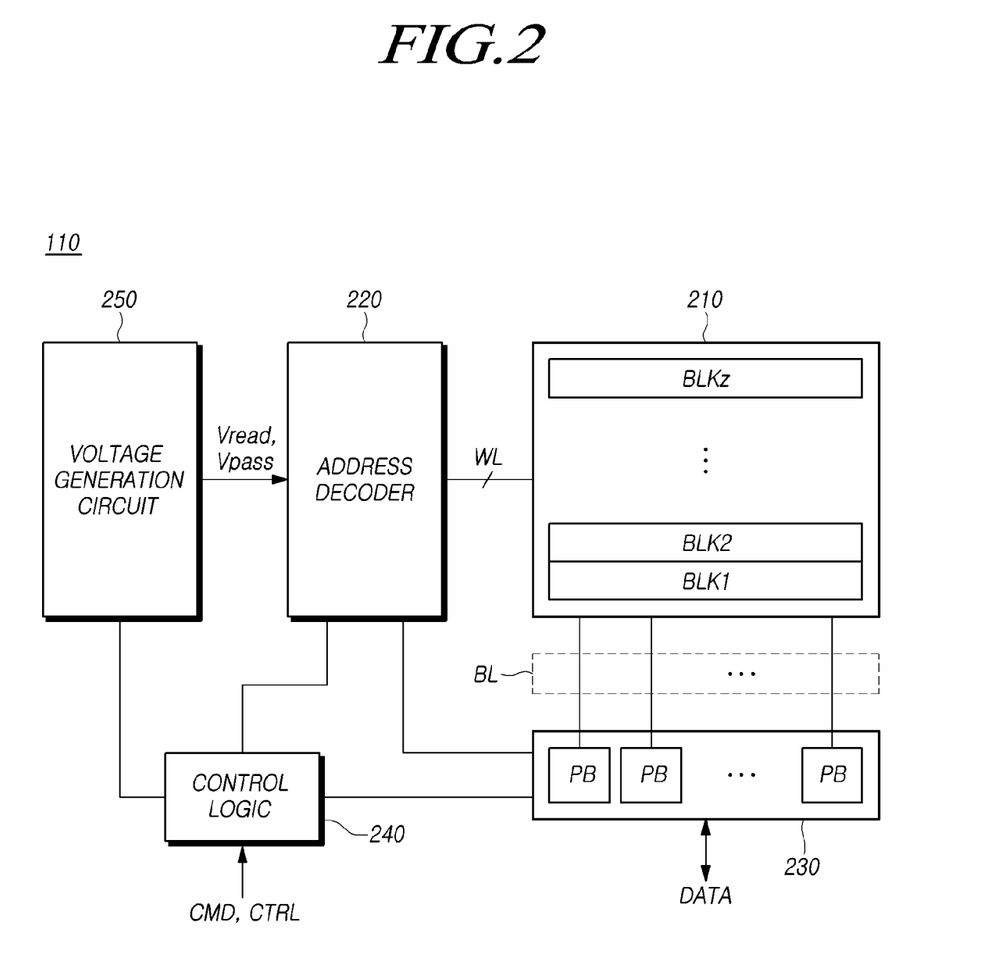
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed in units of a page, and an erase operation may be performed in units of a memory block.

Figure 3:
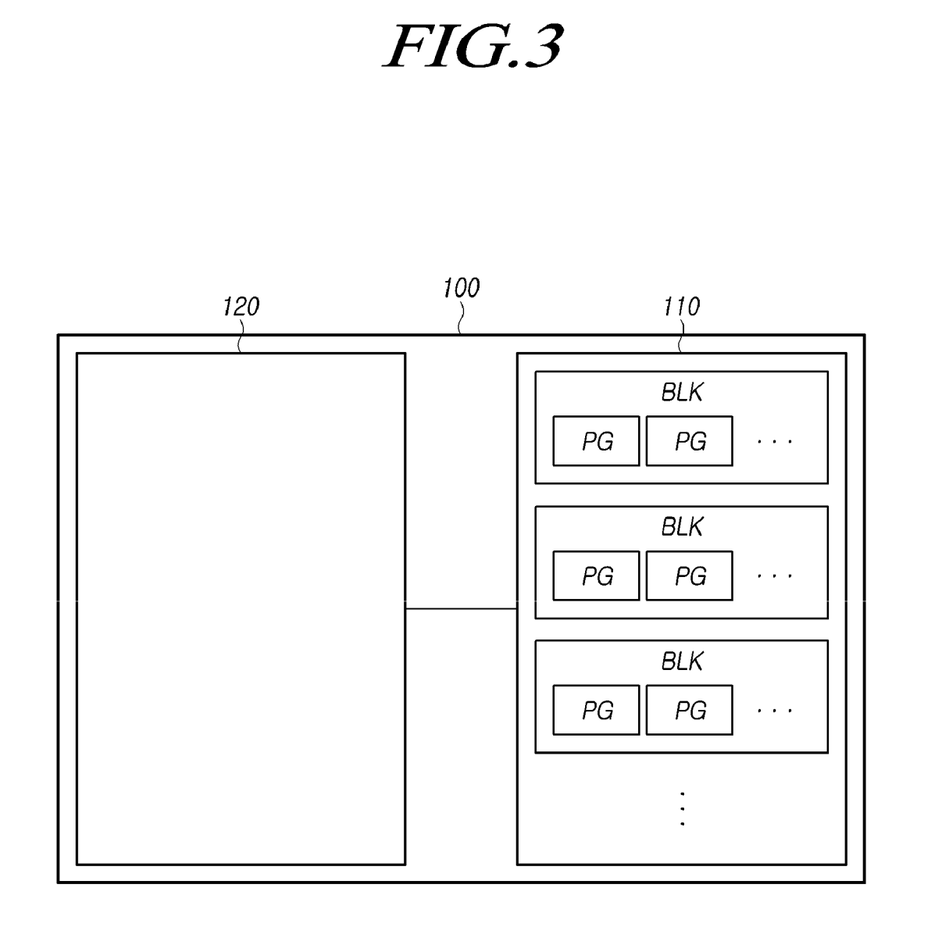
FIG. 3 illustrates a schematic structure of a storage device according to embodiments of the present disclosure.

FIG. 3 illustrates a schematic structure of a storage device 100 according to embodiments of the present disclosure.

Referring to FIG. 3, a storage device 100 may include a memory 110 and a controller 120.

The memory 110 may include a plurality of memory blocks BLK. Each of the plurality of memory blocks BLK may include a plurality of pages PG.

The controller 120 may control the memory 110 to store data in the memory 110 and read data from the memory 110. Hereinafter, this configuration is will be described in detail in FIG. 4.

Figure 4:
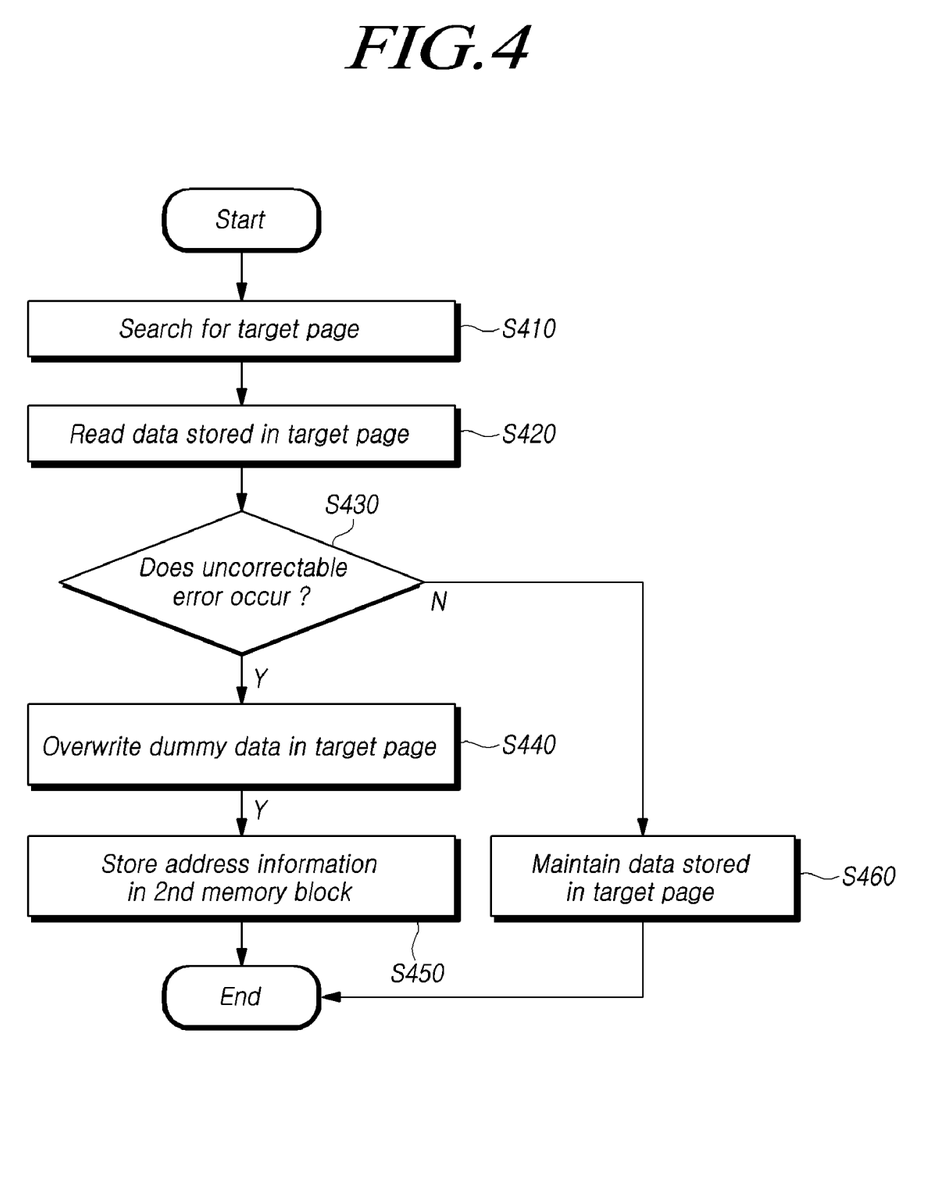
FIG. 4 is a flowchart schematically illustrating an operation of a storage device according to embodiments of the present disclosure.

FIG. 4 is a flowchart schematically illustrating an operation of a storage device 100 according to embodiments of the present disclosure.

Referring to FIG. 4, the controller 120 of the storage device 100 may search for a target page among pages included in a first memory block among a plurality of memory blocks BLK (S410). This operation will be described in detail in FIG. 5.

The controller 120 may read data stored in the target page searched for in step S410 (S420).

Thereafter, the controller 120 may determine whether an uncorrectable error (UECC or Uncorrectable ECC) occurred while reading data stored in the target page (S430). For example, the controller 120 may count the number of error bits generated while reading data stored in the target page, and determine that an uncorrectable error has occurred if the counted number of error bits exceeds a maximum correctable number of error bits.

The controller 120 may attempt error correction on data read through an error detection and correction circuit 126 described in the text related to FIG. 1. If it is impossible for the error detection and correction circuit 126 to correct the error, the controller 120 may determine that an uncorrectable error has occurred.

If an uncorrectable error occurs (S430—Y), the controller 120 may overwrite data in the target page with dummy data (S440). Hereinafter, this will be described in detail in FIG. 6.

The controller 120 may store address information indicating a location of the target page in a second memory block among the plurality of memory blocks BLK (S450). Hereinafter, this will be described in detail in FIG. 7.

Meanwhile, if an uncorrectable error does not occur (S430—N), the controller 120 may maintain data stored in the target page without overwriting that data with the dummy data (S460).

Figure 5:
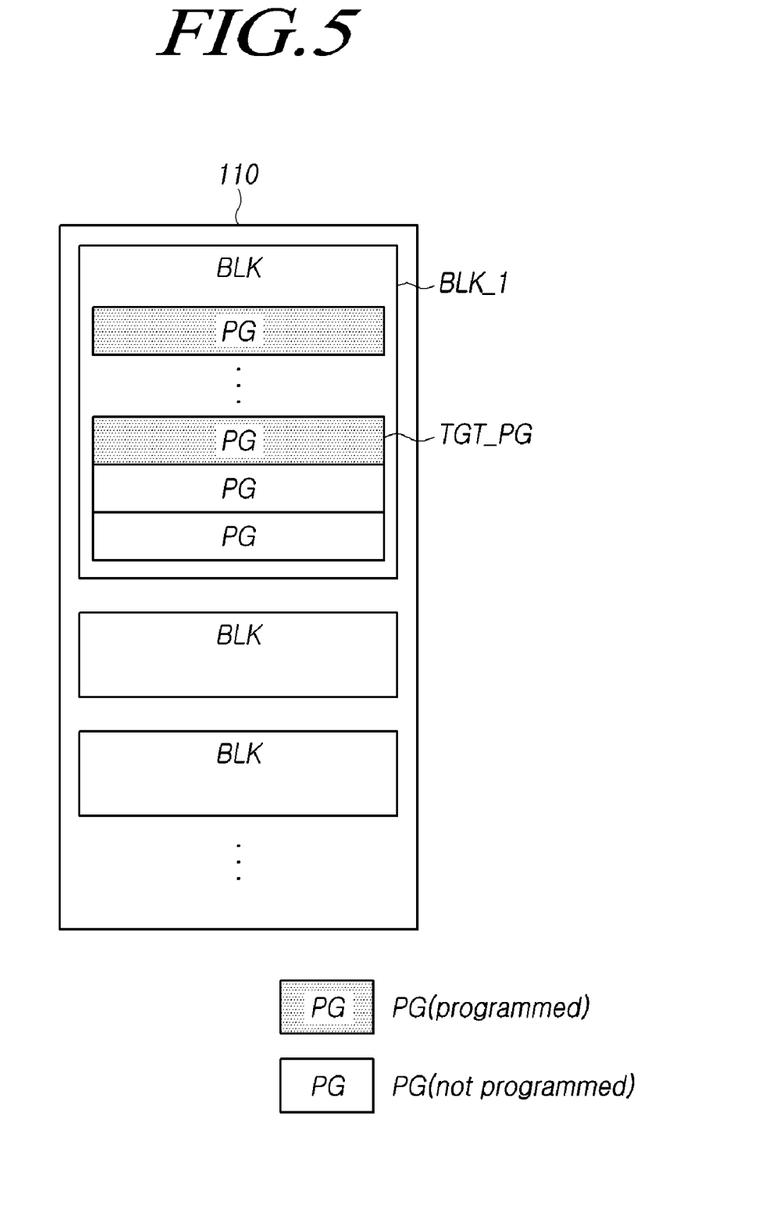
FIG. 5 illustrates an operation of searching for a target page by a storage device according to embodiments of the present disclosure.

FIG. 5 illustrates an operation of searching for a target page TGT_PG by a storage device 100 according to embodiments of the present disclosure.

Referring to FIG. 5, the controller 120 of the storage device 100 may search for a target page TGT_PG among pages PG included in a first memory block BLK_1 among a plurality of memory blocks BLK included in the memory 110.

For example, the first memory block BLK_1 may be an open memory block (that is, a memory block in which some but not all pages have been programmed and the remainder are still erased) in which user data is written. If a sudden power-off (SPO) occurs after user data is written in the first memory block BLK_1 and before the first memory block BLK_1 is in a closed state, the controller 120 may search for the target page TGT_PG among pages PG included in the first memory block BLK_1 during a sudden power-off recovery (SPOR) operation.

The controller 120 may search for the target page TGT_PG in the first memory block BLK_1 while a specific operation is being performed.

For example, the controller 120 may search for the target page TGT_PG during the SPOR operation. As another example, the controller 120 may search for the target page TGT_PG during a normal power-off (NPO) operation.

The controller 120 may determine the target page TGT_PG from among the pages PG included in the first memory block BLK_1 in various ways.

For example, the target page TGT_PG may be a page to which data is programmed last among pages PG included in the first memory block BLK_1. That is, the controller 120 may exclude pages in which data is not programmed from among the pages PG included in the first memory block BLK_1, and may determine a page with the most recently programmed data among the remaining data-programmed pages as the target page TGT_PG.

As another example, the target page TGT_PG may be one erased page among pages PG included in the first memory block BLK_1.

The controller 120 may perform, in order to search for a page in which data is programmed last among pages PG included in the first memory block BLK_1, a binary search or a sequential search based on the index of the pages PG included in the first memory block BLK_1.

Figure 6:
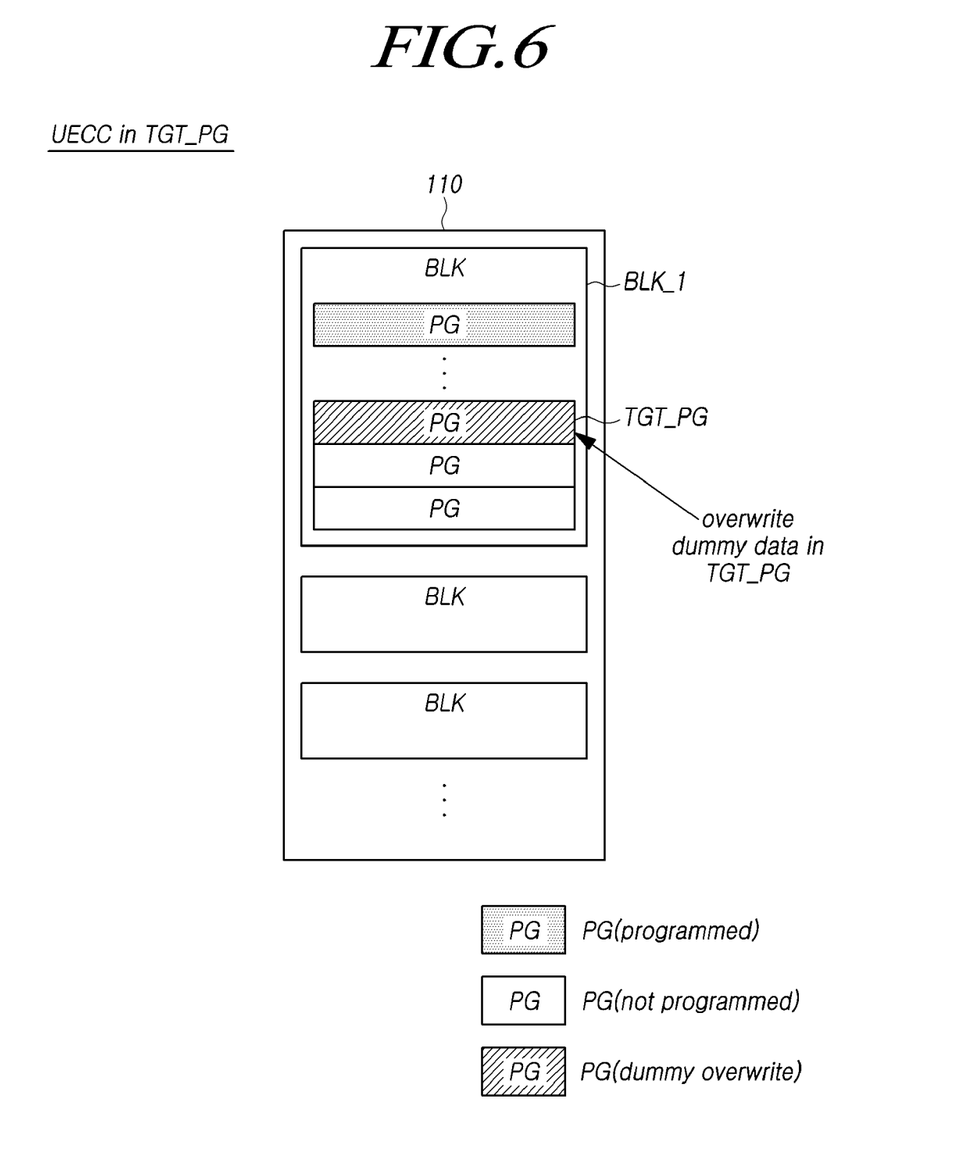
FIG. 6 illustrates an operation of overwriting dummy data into a target page by a storage device according to embodiments of the present disclosure.

FIG. 6 illustrates an operation of overwriting dummy data into a target page TGT_PG by a storage device 100 according to embodiments of the present disclosure. Herein, overwriting refers to programming data into cells that may contain previously-programmed data, in contrast to writing which refers to programming data only into erased cells.

As described above, the controller 120 of the storage device 100 may overwrite dummy data into the target page TGT_PG in response to an uncorrectable error occurring while reading data stored into the target page TGT_PG. If the dummy data is overwritten into the target page TGT_PG, the distribution of threshold voltages of memory cells corresponding to the target page TGT_PG can be surely changed, so that it is possible to prevent the uncertain determination of the normal state or abnormal state of the state of the target page TGT_PG.

In this case, each of the bytes included in the dummy data may have a preset pattern value (e.g., 0x33, 0x44, 0x55).

Figure 7:
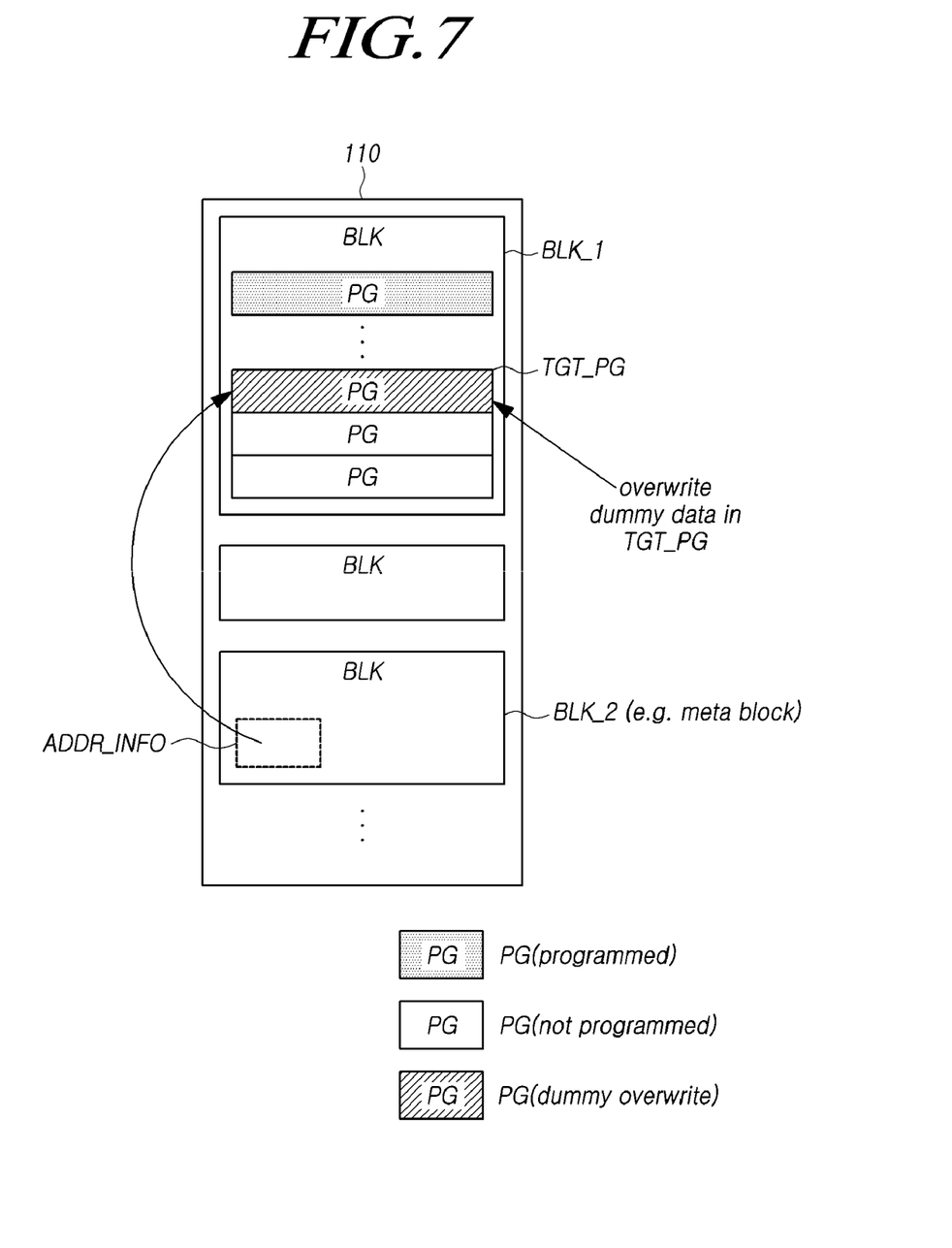
FIG. 7 illustrates an operation of storing address information by a storage device according to embodiments of the present disclosure.

FIG. 7 illustrates an operation of storing address information ADDR_INFO by a storage device 100 according to embodiments of the present disclosure.

As described above, the controller 120 of the storage device 100 may overwrite dummy data into the target page TGT_PG and may store address information ADDR_INFO indicating the location of the target page TGT_PG in a second memory block BLK_2 among the plurality of memory blocks BLK.

In this case, the second memory block BLK_2 may be different from the first memory block BLK_1. For example, the second memory block BLK_2 may be a meta data block in which meta data is stored.

The address information ADDR_INFO may include various information required to indicate the location of the target page TGT_PG.

For example, the address information ADDR_INFO may include at least one of channel information about the first memory block BLK_1, way information about the first memory block BLK_1, an offset of the first memory block BLK_1, or an offset of the target page TGT_PG.

The reason for storing the address information ADDR_INFO indicating the location of the target page TGT_PG in the second memory block (BLK_2) is to prevent an operation of reading the target page TGT_PG in order to confirm that dummy data is written into the target page TGT_PG.

An uncorrectable error may occur when performed a read operation for the target page TGT_PG in which dummy data is written. In this case, one or more ECC algorithms may be performed to determine whether an uncorrectable error has occurred in the target page TGT_PG. As a result, the process of confirming that dummy data that was written to the target page TGT_PG may require a long time. As a result, if a read operation is performed for the target page TGT_PG during the SPOR operation, the time required for the boot-up operation after the SPO may rapidly increase.

Accordingly, the controller 120 may determine whether the dummy data is written in the target page TGT_PG by determining determine whether the address information ADDR_INFO is stored in the second memory block BLK_2, without performing a read operation on the target page TGT_PG, thereby determining more quickly whether dummy data was written to the target page TGT_PG. As a result, it is possible to reduce the time required for a boot-up operation after the SPO.

In the above, it has been described an operation of searching for the target page TGT_PG, an operation of writing dummy data to the target page TGT_PG, and an operation of storing address information ADDR_INFO of the target page TGT_PG by the storage device 100.

Hereinafter, specific embodiments will be described in which the storage device 100 utilizes address information ADDR_INFO of the target page TGT_PG.

Figure 8:
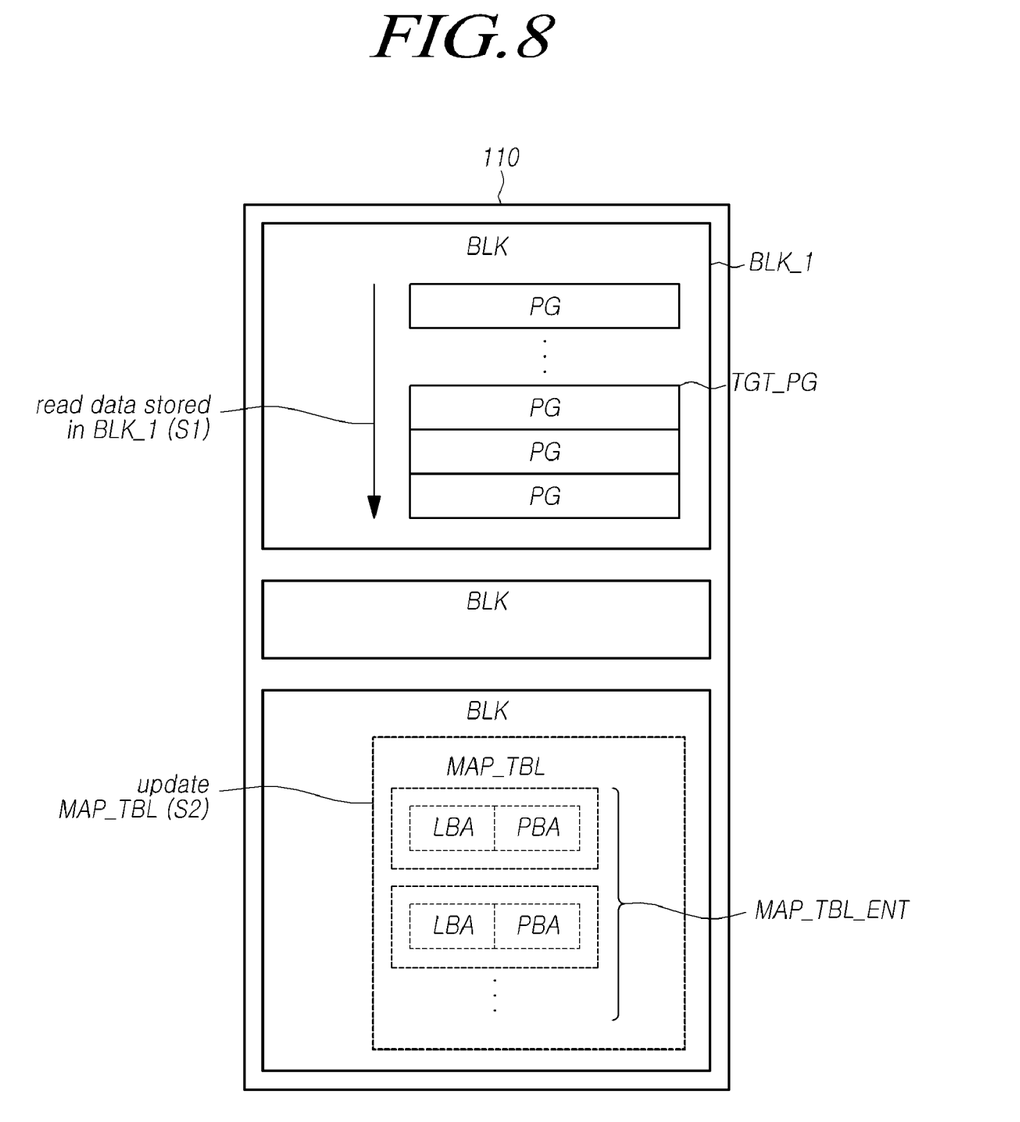
FIG. 8 illustrates an operation of updating a mapping table by a storage device according to embodiments of the present disclosure.

FIG. 8 illustrates an operation of updating a mapping table MAP_TBL performed by a storage device 100 according to embodiments of the present disclosure.

Referring to FIG. 8, the controller 120 of the storage device 100 may perform an operation of updating a mapping table MAP_TBL based on data stored in the pages PG included in the first memory block BLK_1.

For example, a SPO may occur before mapping information for data stored in pages PG included in the first memory block BLK_1 is reflected in the mapping table MAP_TBL. In this case, the controller 120 may read the data stored in the pages PG included in the first memory block BLK_1 during the SPOR operation, and update the mapping table MAP_TBL based on the read data, thereby recovering the mapping table MAP_TBL.

The mapping table MAP_TBL may include one or more mapping table entries MAP_TBL_ENT. Each mapping table entry may indicate a mapping relationship between a logical address LBA and a physical address PBA.

The mapping table MAP_TBL may be stored in one or more of the plurality of memory blocks BLK included in the memory 110. In FIG. 8, an example in which the mapping table MAP_TBL is stored in one memory block is disclosed, but embodiments are not limited thereto, and the mapping table MAP_TBL according to embodiments of the present disclosure may be distributed and stored in a plurality of memory blocks.

The controller 120 may read data stored in the first memory block BLK_1 (S1). The controller 120 may search the pages PG included in the first memory block BLK_1 and determine whether to read data stored in each page. In this case, the controller 120 may also determine whether to read the data stored in the aforementioned target page TGT_PG.

The controller 120 may update the mapping table MAP_TBL based on data read from the first memory block BLK_1 (S2).

Figure 9:
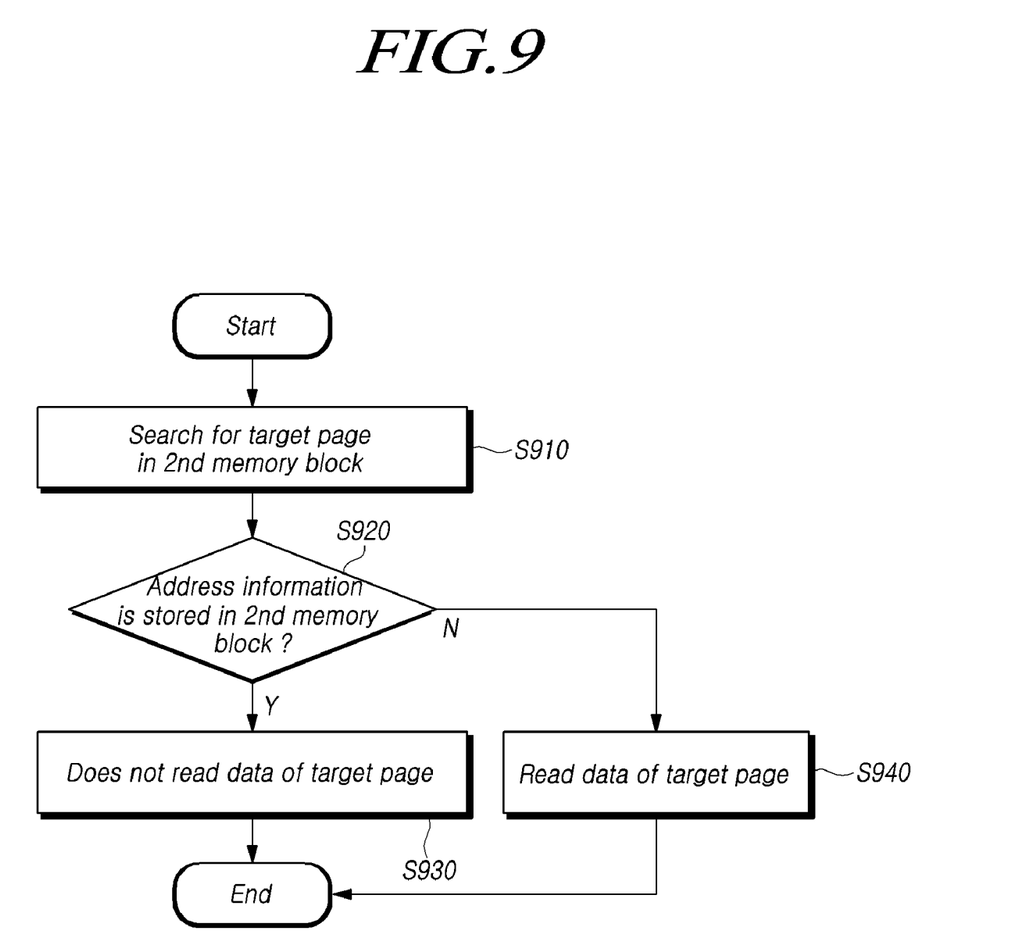
FIG. 9 is a flowchart illustrating an operation of determining whether to read data of a target page while a storage device updates a mapping table according to embodiments of the present disclosure.

FIG. 9 is a flowchart illustrating an operation of determining whether to read data of a target page TGT_PG while a storage device 100 updates a mapping table MAP_TBL according to embodiments of the present disclosure.

In order to determine whether to read data of the target page TGT_PG, the controller 120 of the storage device 100 may search for address information ADDR_INFO for the target page TGT_PG in the aforementioned second memory block BLK_2 (S910).

The controller 120 may also determine whether address information ADDR_INFO for the target page TGT_PG is stored in the second memory block BLK_2 (S920).

If address information ADDR_INFO for the target page TGT_PG is found in the second memory block BLK_2 (S920—Y), the controller 120 may not read data of the target page TGT_PG (S930). As described above, this is because dummy data is stored in the target page TGT_PG, and if the dummy data is read, the ECC algorithm operates, resulting in a rapid increase in the time required to read the data of the target page TGT_PG.

On the other hand, if the address information ADDR_INFO for the target page TGT_PG is not found in the second memory block BLK_2 (S920—N), the controller 120 may read the data of the target page TGT_PG (S940).

Figure 10:
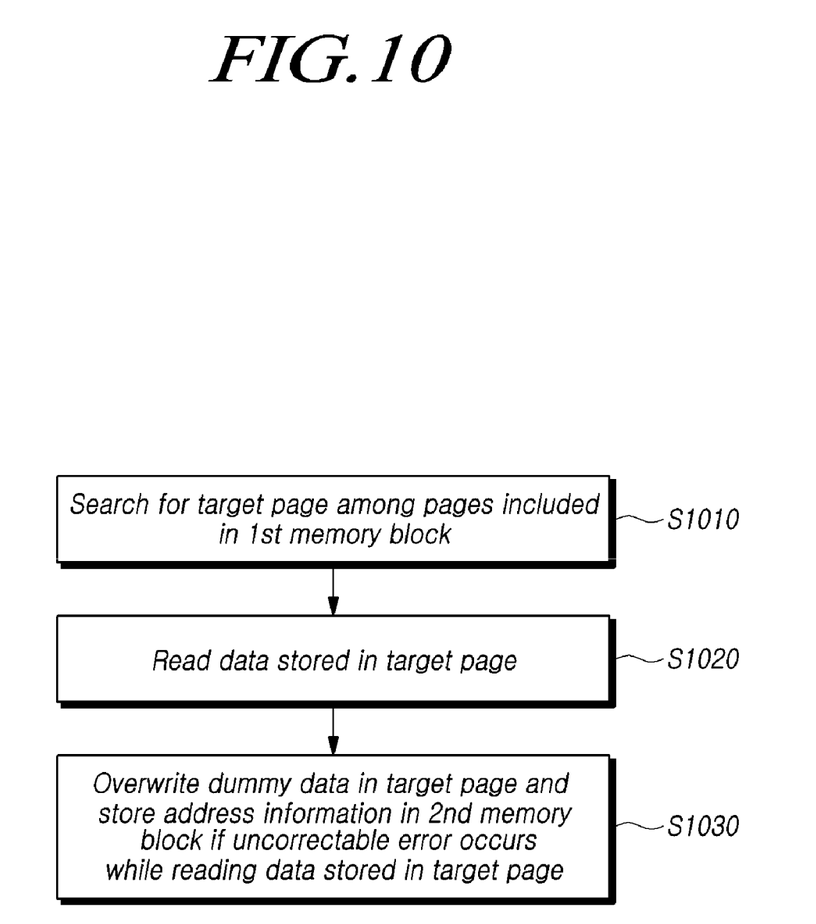
FIG. 10 is a diagram illustrating an operating method of a storage device according to embodiments of the present disclosure.

FIG. 10 is a diagram illustrating an operating method of a storage device 100 according to embodiments of the present disclosure.

Referring to FIG. 10, an operating method of a storage device 100 may include searching for a target page TGT_PG among pages included in a first memory block BLK_1 among a plurality of memory blocks BLK each including a plurality of pages PG (S1010).

For example, step S1010 may be performed during a sudden power-off recovery (SPOR) operation.

For example, the target page TGT_PG may be a page in which data was programmed last among pages included in the first memory block BLK_1.

In addition, the operating method of a storage device 100 may include reading data stored in the target page TGT_PG (S1020).

Further, the operating method of the storage device 100 may include, if an uncorrectable error occurs while reading data stored in the target page TGT_PG, overwriting dummy data into the target page TGT_PG and storing address information ADDR_INFO indicating a location of the target page TGT_PG in a second memory block BLK_2 among a plurality of memory blocks BLK (S1030).

For example, the second memory block BLK_2 may be a meta data block in which meta data is stored.

Meanwhile, the operating method of the storage device 100 may further include performing an operation of updating the mapping table MAP_TBL based on data stored in pages included in the first memory block BLK_1.

In this case, performing the operation of updating the mapping table MAP_TBL may include not reading the data of the target page TGT_PG if the address information ADDR_INFO is stored in the second memory block (BLK_2), and reading data of the target page TGT_PG if the address information ADDR_INFO is not stored in the second memory block BLK_2.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. An operating method of a storage device, the method comprising:
    searching for a target page among pages included in a first memory block among a plurality of memory blocks each of which includes a plurality of pages;
    reading data stored in the target page;
    after detecting an uncorrectable error while reading data stored in the target page, overwriting dummy data into the target page to change the distribution of threshold voltages of memory cells corresponding to the target page and to prevent the uncertain determination of the normal state or abnormal state of the state of the target page, and
    storing address information indicating a location of the target page in a second memory block among the plurality of memory blocks.

2. The operating method of claim 1, wherein the searching for a target page is performed during a sudden power-off recovery (SPOR) operation.

3. The operating method of claim 1, wherein the target page is a page in which data is programmed last among pages included in the first memory block.

4. The operating method of claim 1, wherein the second memory block is a meta data block in which meta data is stored.

5. The operating method of claim 1, further comprising performing an operation of updating a mapping table based on data stored in pages included in the first memory block.

6. The operating method of claim 5, wherein the operation of updating the mapping table comprises:
    determining whether the address information is stored in the second memory block;
    not reading the data of the target page when the address information is determined to be stored in the second memory block, and
    reading data of the target page when the address information is determined to not be stored in the second memory block.

7. A storage device comprising:
    a memory including a plurality of memory blocks each of which includes a plurality of pages; and
    a controller configured to:
        search for a target page among pages included in a first memory block of the plurality of memory blocks, and
        after detecting an uncorrectable error while reading data stored in the target page, overwrite dummy data into the target page to change the distribution of threshold voltages of memory cells corresponding to the target page and to prevent the uncertain determination of the normal state or abnormal state of the state of the target page and store address information indicating a location of the target page in a second memory block among the plurality of memory blocks.

8. The storage device of claim 7, wherein the search for the target page is performed during a sudden power-off recovery (SPOR) operation.

9. The storage device of claim 7, wherein the target page is a page in which data was programmed last among pages included in the first memory block.

10. The storage device of claim 7, wherein each of bytes included in the dummy data is set to a preset pattern value.

11. The storage device of claim 7, wherein the second memory block is a meta data block in which meta data is stored.

12. The storage device of claim 7, wherein the address information comprises at least one of channel information for the first memory block, way information for the first memory block, an offset for the first memory block, or an offset for the target page.

13. The storage device of claim 7, wherein the controller performs an operation of updating a mapping table based on data stored in pages included in the first memory block.

14. The storage device of claim 13, wherein the controller is further configured to:
   determine whether the address information is stored in the second memory block,
   not read the data of the target page when the address information is determined to be stored in the second memory block, and
   read the data of the target page when the address information is determined to not be stored in the second memory block.

15. A controller comprising:
   a memory interface configured to communicate with a memory including a plurality of memory blocks each of which includes a plurality of pages; and
   a control circuit configured to:
   search for a target page, which is a page in which data is programmed last, among pages included in a first memory block of the plurality of memory blocks during a boot-up operation after a sudden power-off (SPO), and
   after detecting an uncorrectable error while reading data stored in the target page, overwrite dummy data into the target page to change the distribution of threshold voltages of memory cells corresponding to the target page and to prevent the uncertain determination of the normal state or abnormal state of the state of the target page and store a location of the target page in a second memory block of the plurality of memory blocks.

* * * * *